(12) United States Patent
Scherr et al.

(10) Patent No.: US 11,291,527 B2
(45) Date of Patent: Apr. 5, 2022

(54) TOOL FOR SEATING AN ORTHODONTIC ALIGNER AND METHOD OF USING SAME

(71) Applicant: IDM Tooling, LLC, Carrollton, TX (US)

(72) Inventors: Shannon Marie Scherr, Carrollton, TX (US); Michael Woodford Freitas, Burnet, TX (US)

(73) Assignee: IDM Tooling, LLC, Carrollton, TX (US)

( * ) Notice: Subject to any disclaimer, the term of this patent is extended or adjusted under 35 U.S.C. 154(b) by 154 days.

(21) Appl. No.: 16/532,884

(22) Filed: Aug. 6, 2019

(65) Prior Publication Data
US 2020/0100872 A1 Apr. 2, 2020

Related U.S. Application Data

(63) Continuation-in-part of application No. 29/665,003, filed on Sep. 28, 2018, now Pat. No. Des. 879,292.

(51) Int. Cl.
*A61C 7/02* (2006.01)
*A61C 7/14* (2006.01)
(Continued)

(52) U.S. Cl.
CPC .............. *A61C 7/146* (2013.01); *A61C 7/02* (2013.01); *A61C 7/08* (2013.01); *A61C 7/10* (2013.01); *A61C 7/36* (2013.01)

(58) Field of Classification Search
CPC ....... A61C 7/10; A61C 17/222; A61C 17/225; A61C 7/146; A61C 7/02; A61C 7/08;
(Continued)

(56) References Cited

U.S. PATENT DOCUMENTS

D138,683 S * 8/1944 Rolfes ........................ D22/112
2,517,912 A * 8/1950 Nathan ...................... A46B 7/04
401/201
(Continued)

OTHER PUBLICATIONS

Vinny R. Sastri, Plastics in Medical Devices, 2014, 9—Other Polymers: Styrenics, Silicones, Thermoplastic Elastomers, Biopolymers, and Thermosets, William Andrew Publishing, second edition, pp. 215-261, (Year: 2014).*
(Continued)

*Primary Examiner* — Yogesh P Patel
(74) *Attorney, Agent, or Firm* — Vincent J Allen; Brandon V. Zuniga; Carstens & Cahoon, LLP

(57) ABSTRACT

A tool and method for seating an orthodontic aligner, unseating the aligner, or both. In one aspect, the tool comprises a handle portion and seating portion. The seating portion is connected to the handle portion. The seating portion comprises a rippled structure having the shape of a series of waves, the waves having a direction of propagation directed away from the handle portion. In a second aspect, a handle portion of the tool comprises a hook adjacent to a recess in the handle portion, the hook being configured to unseat an aligner. In a third aspect, the method comprises seating an aligner by holding a handle portion of the tool, positioning the seating portion between sets of teeth and repeatedly biting the seating portion. In a fourth aspect, the method comprises unseating an aligner by holding the rippled seating portion and using the hook to apply force to the aligner.

16 Claims, 12 Drawing Sheets

(51) Int. Cl.
*A61C 7/08* (2006.01)
*A61C 7/10* (2006.01)
*A61C 7/36* (2006.01)

(58) Field of Classification Search
CPC .......... A61C 7/36; A61C 3/00; A61C 2201/00; A61C 13/225–277; B25G 1/00; B25G 1/10; B25G 1/102; A46B 5/02; A61B 17/244; A61J 17/00
USPC .................. 433/6, 3, 141–144; D24/140
See application file for complete search history.

(56) References Cited

U.S. PATENT DOCUMENTS

| | | | | | |
|---|---|---|---|---|---|
| 4,885,581 | A | * | 12/1989 | Sugawara | H03M 1/1038 341/145 |
| 4,904,183 | A | * | 2/1990 | Hannan | A61C 7/02 433/3 |
| D307,376 | S | * | 4/1990 | Kawasaki | D7/652 |
| 4,975,051 | A | * | 12/1990 | Kargas | A61C 7/02 433/3 |
| 5,039,302 | A | * | 8/1991 | Keys | A61C 7/02 433/3 |
| D320,658 | S | * | 10/1991 | Quigley | D24/135 |
| 5,575,643 | A | * | 11/1996 | Green | A61C 7/306 433/3 |
| 6,101,659 | A | * | 8/2000 | Halm | A46B 7/02 15/167.1 |
| 6,174,162 | B1 | * | 1/2001 | Pozzi | A61C 7/02 433/141 |
| D494,272 | S | * | 8/2004 | Ripich | D24/133 |
| D500,135 | S | * | 12/2004 | Ripich | A61C 7/02 D24/133 |
| D549,331 | S | * | 8/2007 | Tomatsu | A61C 7/02 D24/133 |
| 8,062,030 | B2 | * | 11/2011 | Saubers | A61C 7/02 433/3 |
| 8,152,525 | B2 | * | 4/2012 | Rossi, III | A61C 3/00 433/167 |
| 8,167,612 | B2 | * | 5/2012 | DeSanti | A61C 7/02 D22/112 |
| 8,182,266 | B2 | * | 5/2012 | Creasman | A61B 17/02 |
| D832,432 | S | * | 10/2018 | Chappuis | A61C 3/00 433/167 |
| 10,856,859 | B1 | * | 12/2020 | Chappuis | A61B 17/02 |
| 2003/0115699 | A1 | * | 6/2003 | Wagstaff | A46B 15/0055 15/111 |
| 2005/0064358 | A1 | * | 3/2005 | Nicozisis | A61C 7/02 433/3 |
| 2006/0068352 | A1 | * | 3/2006 | Young | A61C 7/02 433/3 |
| 2007/0178419 | A1 | * | 8/2007 | Berman | A61C 7/02 433/3 |
| 2008/0160473 | A1 | * | 7/2008 | Li | A61C 7/02 433/3 |
| 2009/0075227 | A1 | * | 3/2009 | Opin | A61C 7/02 433/11 |
| 2009/0182364 | A1 | * | 7/2009 | Mettler, Jr. | A61B 13/00 606/161 |
| 2009/0246732 | A1 | * | 10/2009 | Creasman | A61C 7/02 433/141 |
| 2011/0045427 | A1 | * | 2/2011 | DeSanti | A61C 7/02 433/3 |
| 2011/0250556 | A1 | * | 10/2011 | Heiser | A61C 7/146 433/3 |
| 2011/0294088 | A1 | * | 12/2011 | Bathen | A61C 7/02 433/3 |
| 2011/0302744 | A1 | * | 12/2011 | Heckel | B25G 1/10 16/430 |
| 2012/0244486 | A1 | * | 9/2012 | Solomon | A46B 7/04 401/201 |
| 2013/0216970 | A1 | * | 8/2013 | Shanmugham | B25G 1/10 16/430 |
| 2015/0093716 | A1 | * | 4/2015 | Fulton, III | A46B 15/0055 15/111 |
| 2015/0297330 | A1 | * | 10/2015 | Ficacci | A46B 7/02 15/167.1 |

OTHER PUBLICATIONS

Charlotte Dentistry, What's Up With The "Chewies"?, Charlotte Dentistry Website, allegedly posted Sep. 15, 2011 per post itself, available at https://www.charlottedentistry.com/blogpatients/2011/09/15/whats-up-with-the-chewies/ (last accessed Dec. 2, 2019).

Munchies: Designed for Clear Aligners and Ortho Braces, allegedly captured Jan. 12, 2016 per Way Back Machine, available at http://web.archive.org/web/20160112215317/http://www.orthomunchies.com (last accessed Dec. 2, 2019).

Why I Created Movemints, the Invisalign Chewies Alternative, article allegedly posted Jul. 17, 2017, available at https://www.dentalmovemints.com/blogs/invisalign-tips-and-tricks/movemints-clear-aligner-mints-invisalign-chewies-alternative (last accessed Jan. 14, 2020).

An offer to sell the device illustrated in Design U.S. Appl. No. 29/665,003, filed Sep. 28, 2018, is believed to have occurred on Mar. 8, 2018.

* cited by examiner

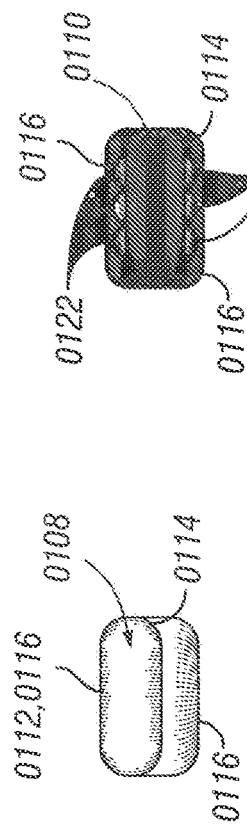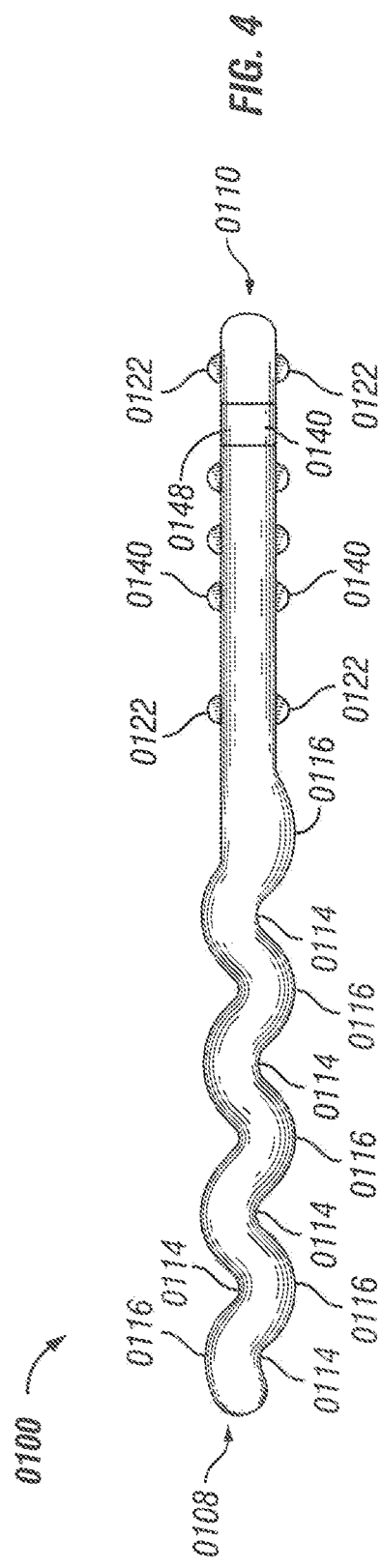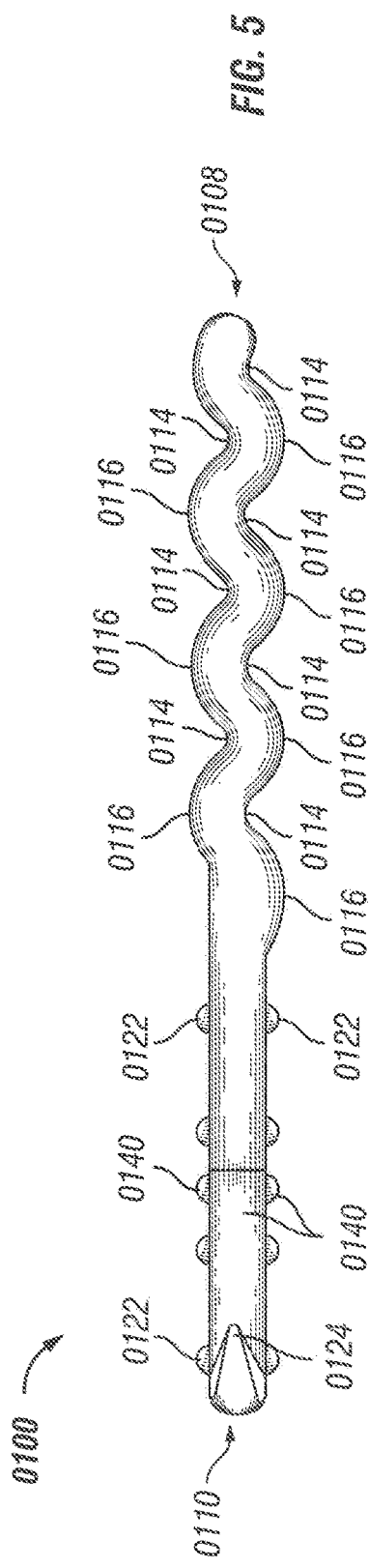

TOOL FOR SEATING AN ORTHODONTIC ALIGNER AND METHOD OF USING SAME

CROSS-REFERENCE TO RELATED APPLICATIONS

This application is a continuation-in-part of and claims priority U.S. Design application No. 29/665,003, filed Sep. 28, 2018, which is incorporated herein by reference in its entirety as an example.

BACKGROUND OF THE INVENTION

Technical Field

The present invention relates to a tool for seating an orthodontic aligner. In some aspects, the present invention relates to a tool for seating and unseating an orthodontic aligner. Moreover, in some aspects, the present invention relates to a tool that fits within a case for an orthodontic aligner.

Description of Related Art

In order for orthodontic patients to optimize teeth movement, experts recommend seating orthodontic aligners by chewing on something that is firm. Existing options for seating aligners include aspects that can be undesirable. For example, existing devices can be bulky, uncomfortable, too large to fit in an orthodontic aligner case, less durable than desired, have a less than desirable life span, or have an undesirably high cost.

After an orthodontic aligner is seated on a patient, the patient needs a way to remove the orthodontic aligner. Because orthodontic aligners can be difficult to remove without a tool, it can be desirable to use a tool to facilitate unseating and removing the orthodontic aligner. Existing tools used for this purpose are separate devices from the devices used to seat an orthodontic aligner. Accordingly, existing tools for seating and removing orthodontic aligners require a patient to purchase, keep track of, store, or clean multiple devices, which can be undesirable.

SUMMARY OF SELECTED EMBODIMENTS OF THE INVENTION

In accordance with a first embodiment, a tool for seating an orthodontic aligner is provided. The tool comprises a handle portion and a seating portion. The handle portion is configured to be held by a hand of a human user. The seating portion is connected to the handle portion and configured to seat an orthodontic aligner against the teeth of the human user. The seating portion comprises a rippled structure.

In accordance with a second embodiment, a tool for seating an orthodontic aligner is provided. The tool comprises a handle portion and a seating portion. The handle portion is configured to be held by a hand of a human user. The seating portion is connected to the handle portion and configured to seat an orthodontic aligner against the teeth of the human user. The seating portion comprises a rippled structure. The handle portion comprises a hook, and the hook is configured to unseat an orthodontic aligner while the seating portion is held by the hand of the human user.

In accordance with a third embodiment, a method of seating an orthodontic aligner using a tool is provided. The method comprises several steps. A first step comprises holding a handle portion of the tool, which tool comprises the handle portion and a rippled seating portion opposite the handle portion. A second step comprises positioning the seating portion of the tool between an upper set of teeth and a lower set of teeth. A third step comprises biting the seating portion of the tool to seat the orthodontic aligner on the upper set of teeth or the lower set of teeth.

In accordance with a fourth embodiment, a method of unseating an orthodontic aligner using a tool is provided. The method comprises several steps. A first step comprises holding a rippled seating portion of the tool. The tool comprises the seating portion and a handle portion opposite the seating portion, and the handle portion comprises a hook. A second step comprise using the hook to contact and apply force to a contacted portion of the aligner, thereby unseating the aligner to facilitate removal of the aligner.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

FIG. 2 is a front view of the tool of FIG. 1.

FIG. 3 is a rear view of the tool of FIG. 1.

FIG. 4 is a right view of the tool of FIG. 1.

FIG. 5 is a left view of the tool of FIG. 1.

DETAILED DESCRIPTION

In some embodiments, the tools and methods described in the present application solve one or more problems. For example, in some embodiments, the tools and methods can help an orthodontic patient to increase teeth movement associated with an orthodontic aligner, for example, by helping the orthodontic patient to seat an orthodontic aligner. In some embodiments, the tools are less bulky, more comfortable, or both when compared to existing devices used to seat orthodontic aligners. In some embodiments, the tools are small enough to fit in the majority of orthodontic aligner cases used today in the United States. In some embodiments, the tools are more durable, have a longer useful life span, are less expensive to manufacture, or any combination thereof, when compared to existing devices used to seat orthodontic aligners.

In some embodiments, the tools and methods described in the present application can help an orthodontic patient to unseat and remove an orthodontic aligner. In some embodiments, the tool used for this purpose is also used to seat an orthodontic aligner. Accordingly, in some embodiments, the tool for seating and unseating orthodontic aligners enables a patient to avoid purchasing, keeping track of, storing, or cleaning multiple devices, which can be advantageous compared to existing devices. For example, in some embodiments, the tool for seating and unseating orthodontic aligners is less expensive than a combination of devices for seating and unseating orthodontic aligners.

In some embodiments, the tool comprises, consists essentially of, or consists of two materials so that a first material is softer than the second material to facilitate seating an aligner and the second material is firmer than the first material to facilitate unseating and removing the aligner.

Figure 1:
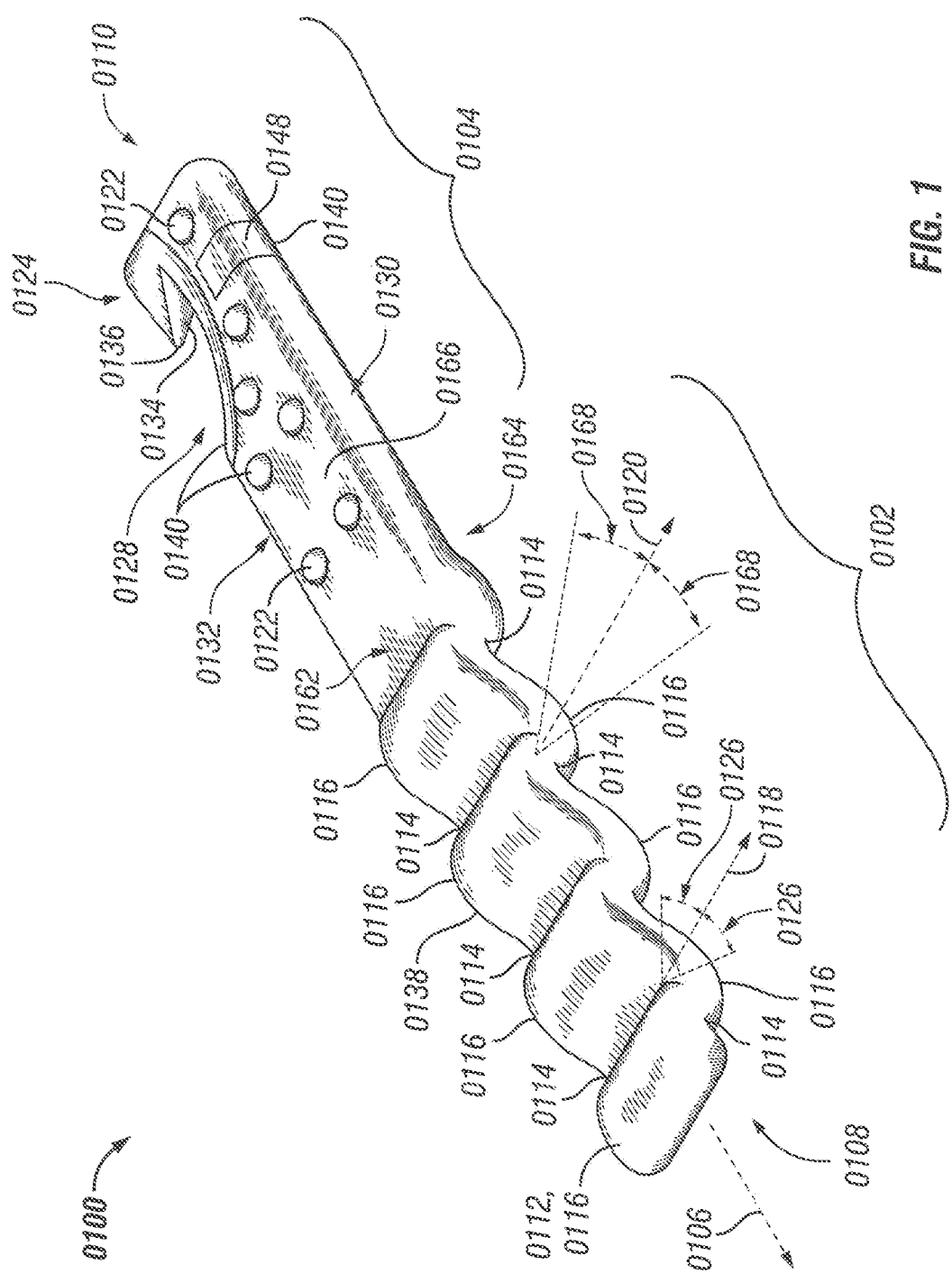
FIG. 1 is a perspective view taken from the front, the top and the right of one embodiment of a tool for seating and removing an orthodontic aligner.

Referring now to FIG. 1, a front perspective view of one embodiment of a tool 0100 for seating and removing an orthodontic aligner 0158 is illustrated, while FIGS. 12A to 13F illustrate an example of an orthodontic aligner 0158. Additional views of the tool of FIG. 1 are illustrated in FIGS. 2-11. Although the tool 0100 is illustrated with a hook 0124 for unseating an orthodontic aligner 0158, further embodiments can be created in which the hook 0124, the associated recess 0128 that provides the hook 0124, a firmer material or materials used to provide the hook 0124, or any combination thereof, are not present in the tool 0100.

The tool 0100 comprises a handle portion 0104 and a seating portion 0102. The handle portion 0104 is configured to be held by a hand 0152 of a human user, for example, as illustrated in FIGS. 12A to 13F. With reference again to FIG. 1, the seating portion 0102 is connected to the handle portion 0104 and configured to seat an orthodontic aligner 0158 against the teeth of the human user.

In some embodiments, the seating portion 0102 comprises a rippled structure. For example, the rippled structure can have the shape of a series of waves having a direction of propagation 0106 directed away from the handle portion 0104. The series of waves comprises a plurality of troughs 0114 and a plurality of peaks 0116, which can alternate. Each wave can be, but is not required to be, complete. The shape of the series of waves can be sinusoidal. As illustrated, the troughs 0114 of the waves extend in a trough transverse direction 0118 that is perpendicular to the direction of propagation 0106, and each trough 0114 has the same trough transverse direction 0118. Although, in some embodiment, the troughs 0114 can have a different trough transverse direction 0118. In some embodiments, the trough transverse direction 0118 of some or all of the troughs 0114 does not need to be completely perpendicular to the direction of propagation 0106. For example, in some embodiments, the trough transverse direction 0118 can vary from being perpendicular to the direction of propagation 0106 within a first angular tolerance 0126, for example, of 30 degrees.

As illustrated in FIG. 1, the peaks 0116 of the waves extend in a peak transverse direction 0120 that is perpendicular to the direction of propagation 0106, and each peak 0116 has the same peak transverse direction 0120. Although, in some embodiment, the peaks 0116 can have a different peak transverse direction 0120. In some embodiments, the peak transverse direction 0120 of some or all of the peaks 0116 does not need to be completely perpendicular to the direction of propagation 0106. For example, in some embodiments, the peak transverse direction 0120 can vary from being perpendicular to the direction of propagation 0106 within a second angular tolerance 0168, for example, of 30 degrees.

As illustrated in FIG. 1, the seating portion 0102 is positioned at the front 0108 of the tool 0100, which is defined by reference to the seating portion 0102. The handle portion 0104 is positioned at the rear 0110 of the tool 0100. Having defined the front 0108 and the rear 0110 of the tool 0100, it is useful to define the top 0162 of the tool 0100 with reference to the front-most peak 0112 of the series of waves. In particular, the top 0162 of the tool 0100 is defined so that the front-most peak 0112 of the series of waves is positioned at the top 0162 of the tool 0100. The bottom 0164 of the tool 0100 is positioned opposite the top 0162 of the tool 0100. Meanwhile, the right side 0130 of the tool 0100 is defined as the side of the tool 0100 that is to the right of the tool 0100 from the perspective of an upwardly oriented viewer who is looking at the tool 0100 while (i) the front 0108 of the tool 0100 is facing the viewer, and (ii) the tool 0100 is positioned with the top 0162 side directed vertically up. The left side 0132 of the tool 0100 is positioned opposite the right side 0130 of the tool 0100.

In some embodiments, the handle portion 0104 comprises a body 0166 and protrusions 0122 that protrude from the body 0166. The protrusions 0122 can be configured to reduce slipping between a hand 0152 and the handle portion 0104 when the handle portion 0104 is in use. The protrusions 0122 are spaced from each other. In some embodiments, the protrusions 0122 are rounded. The protrusions 0122 can be hemispherical.

Figure 6:
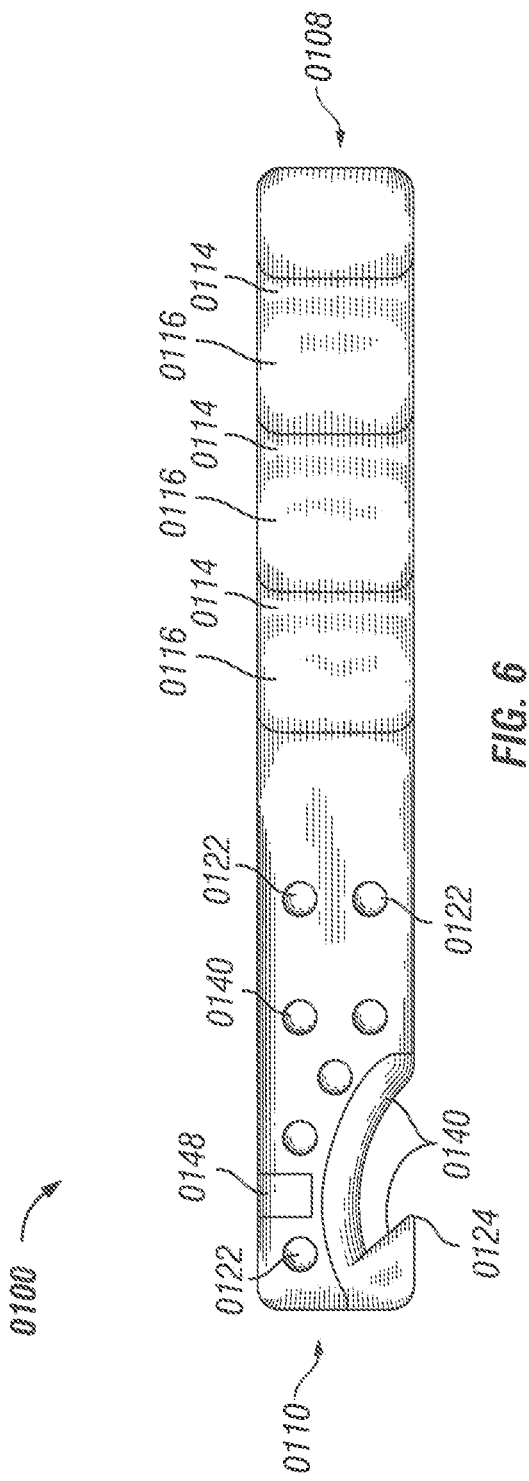
FIG. 6 is a top view of the tool of FIG. 1.
Figure 7:
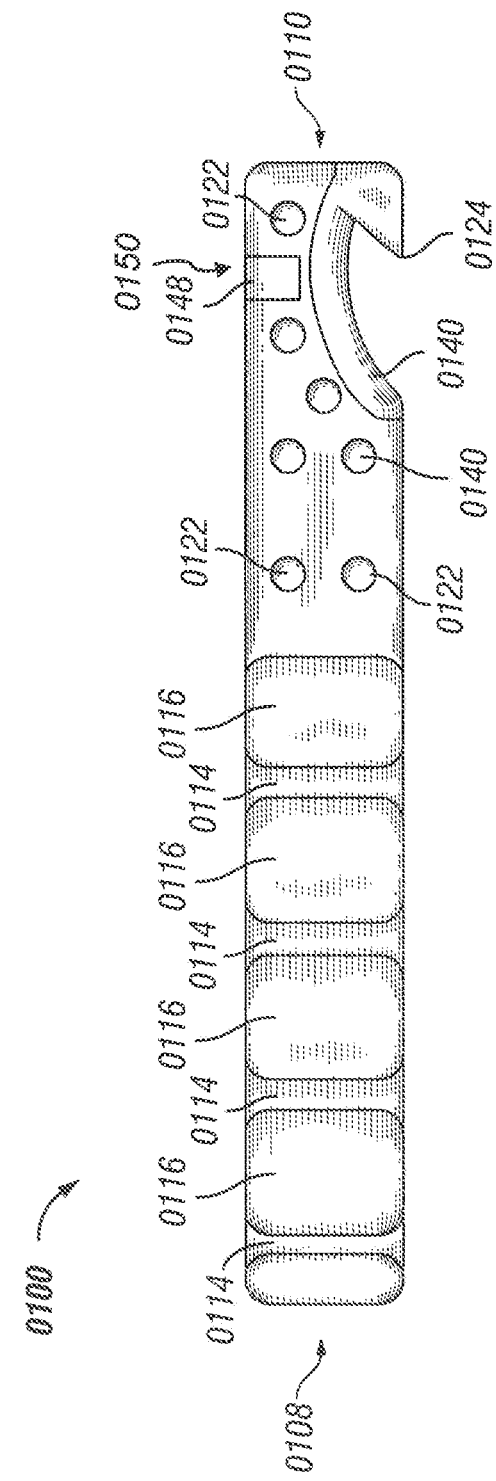
FIG. 7 is a bottom view of the tool of FIG. 1.

With reference to FIG. 1, in some embodiments of a tool, the handle portion 0104 comprises a hook 0124 adjacent to a recess 0128 in the handle portion 0104. Nonetheless, some embodiments of the tool do not comprise the hook 0124, and can, for example, comprise a handle portion 0104 without the hook 0124 or a recess 0128. As illustrated in FIG. 1, the hook 0124 is configured to unseat an orthodontic aligner 0158 while the seating portion 0102 is held by the hand 0152 of a human user. As illustrated, the form of the hook 0124 creates a concave recess 0128 along the left side 0132 of the handle portion 0104. Although, in some embodiments, the hook 0124 can be located along the right side 0130 of the handle portion 0104. The front 0108 portion of the hook 0124 comprises a beveled edge 0134 configured to facilitate catching the orthodontic aligner 0158. In some embodiments, the beveled edge 0134 can be beveled at the top of the edge and the bottom of the edge so that the bevel at the top of the edge and the bevel at the bottom of the edge come together to form the beveled edge 0134. In some embodiments, the hook 0124 can comprise a corner 0136 formed where the beveled edge 0134 meets a side of the handle portion 0104. As illustrated, the beveled edge 0134 faces at least partly toward the front 0108 of the tool 0100. Although, the beveled edge 0134 does not need to face directly toward the front 0108 of the tool 0100. As illustrated, the beveled edge 0134 also faces at least partly inwardly toward the handle portion 0104. For example, as illustrated in FIG. 6, the beveled edge 0134 can form an acute angle, or optionally a right angle, with the concave recess 0128 that forms the hook 0124. In some embodiments, the beveled edge 0134 faces within 55, 50, 45, 35, 30, 25, 20, 15, or 10 degrees of the direction of propagation 0106 of the series of waves in the seating portion 0102 of the tool 0100. As illustrated, the beveled edge 0134 faces a direction that is approximately 45 degrees away from the direction of propagation 0106 and inwardly toward the handle portion 0104. In some embodiments, angles of 45 degrees or less can be more desirable than larger angles because the resulting acute angle that is formed can be too narrow to facilitate catching an orthodontic aligner 0158 in the hook 0124.

Figure 9:
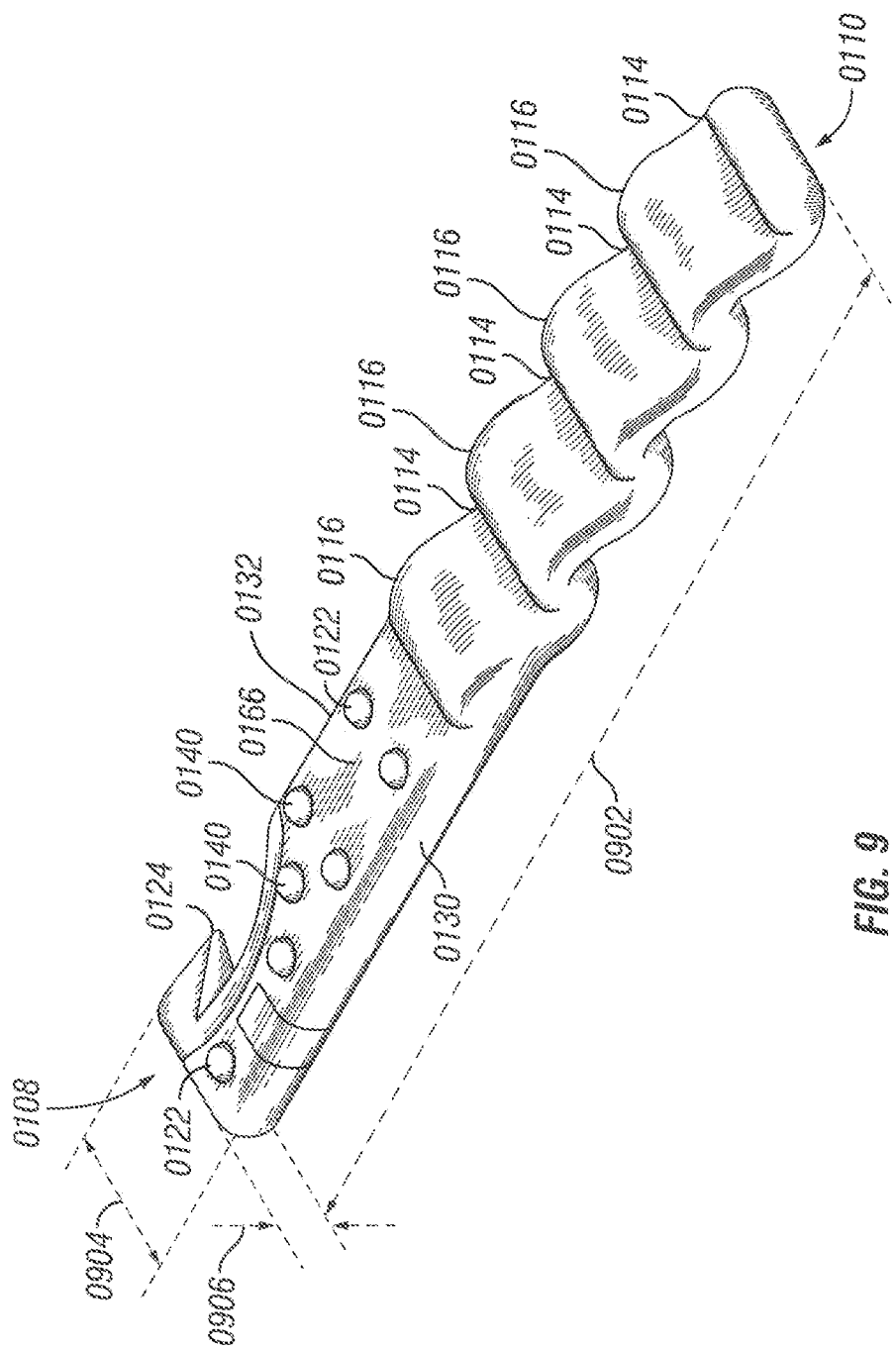
FIG. 9 is a perspective taken from the from the front, the bottom and the right side of the tool of FIG. 1.
Figure 10:
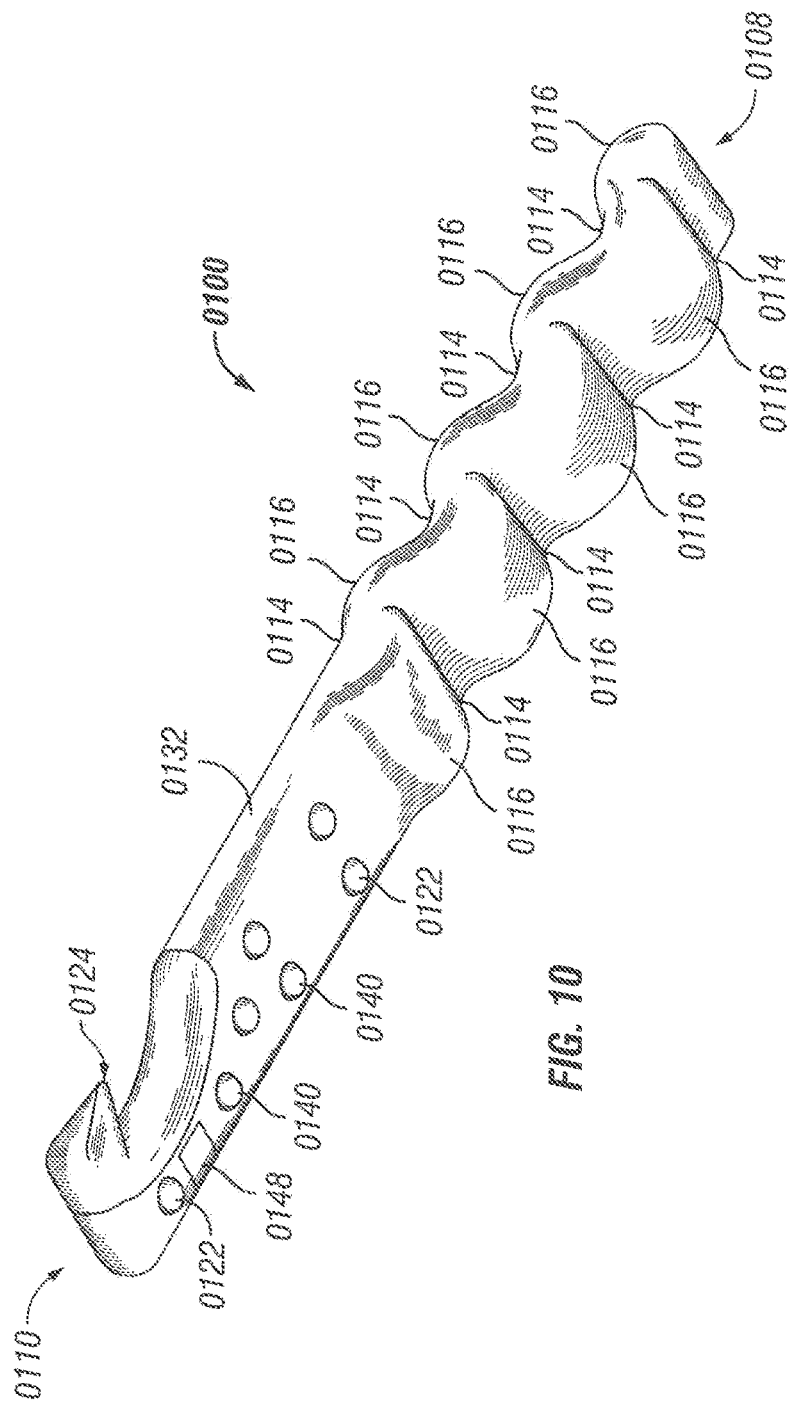
FIG. 10 is perspective view taken from the rear, the bottom and the left side of the tool of FIG. 1.

With reference to FIG. 9, in some embodiments, the tool 0100 is small enough to fit in an orthodontic case. Having a properly sized tool can be useful for other purposes as well. For example, it can be useful if the tool is small enough to fit in an orthodontic case, to be grasped by a typical human hand, to fit between typical sets of human teeth, to seat an orthodontic aligner, to unseat an orthodontic aligner or a combination thereof. Meanwhile, it can be useful if the tool is large enough to accomplish various functions, for example, to be grasped by a typical human hand, to seat an orthodontic aligner, to unseat an orthodontic aligner, or a combination thereof.

For example, the tool 0100 can be approximately 58 mm long 0902 as measured from the front 0108 to the rear 0110 of the tool 0100 along the direction of propagation 0106. The tool can be approximately 8 mm wide 0904 as measured in a direction perpendicular to the direction of propagation 0106 and from the right side 0130 to the left side 0132 of the tool 0100. The tool can be approximately 5 mm thick 0906 as measured in a direction perpendicular to the direction in which the length of the tool 0100 is measured, perpendicular to the direction in which the width of the tool 0100 is measured, and measured from the highest part of the top 0162 of the tool 0100 to the lowest part of the bottom 0164 of the tool 0100. In some embodiments, any dimension of the tool (length, width, thickness, or a combination thereof) can vary by 25, 20, 15, 10, 5, 4, 3, 2, or 1% from the listed dimensions of the illustrative embodiment.

In some embodiments, it can be useful to describe the tool with reference to a rectangular prism that the tool would fit in. This can be useful because the tool can be irregularly shaped. Also, having a tool that is too small to fit inside a larger rectangular prism and too large to fit inside a smaller rectangular prism can be useful to confirm that the tool is appropriately sized to accomplish any function or combination of functions described herein.

In some embodiments, the tool is small enough to fit within a rectangular prism if the length of the rectangular prism is 43 mm (optionally 43, 45, 50, 55, 58, 60, 65, 70 or 73 mm), if the width of the rectangular prism is 6 mm (optionally 6, 6.5, 7, 7.5, 8, 8.5, 9, 9.5, or 10 mm), and if the thickness of the rectangular prism is 3.75 mm (optionally 3.75, 4, 4.25, 4.5, 4.75, 5, 5.25, 5.5, 5.75, 6, or 6.25 mm).

In some embodiments, tool is too large to fit within a rectangular prism if the length of the rectangular prism is less than 73 mm (optionally 73, 70, 65, 60, 58, 55, 50, 45 or 43 mm), if the width of the rectangular prism is less than 10 mm (optionally 10, 9.5, 9, 8.5, 8, 7.5, 7, 6.5, or 6 mm), or if the thickness of the rectangular prism is less than 6.25 mm (optionally 6.25, 6, 5.75, 5.5, 5.25, 5, 4.75, 4.5, 4.25, 4, or 3.75 mm).

As illustrated, the tool 0100 is made from materials that are safe to place in a human mouth. For example, the materials can be United States Food and Drug Administration (FDA) approved, Restriction of Hazardous Substances (RoHS) compliant per European Union Directive 2002/95/EC, or the materials can satisfy the standards established by any other applicable jurisdiction that establishes standards related to the safety of a device that is placed in the mouth to seat or remove orthodontic aligners 0158.

Figure 11:
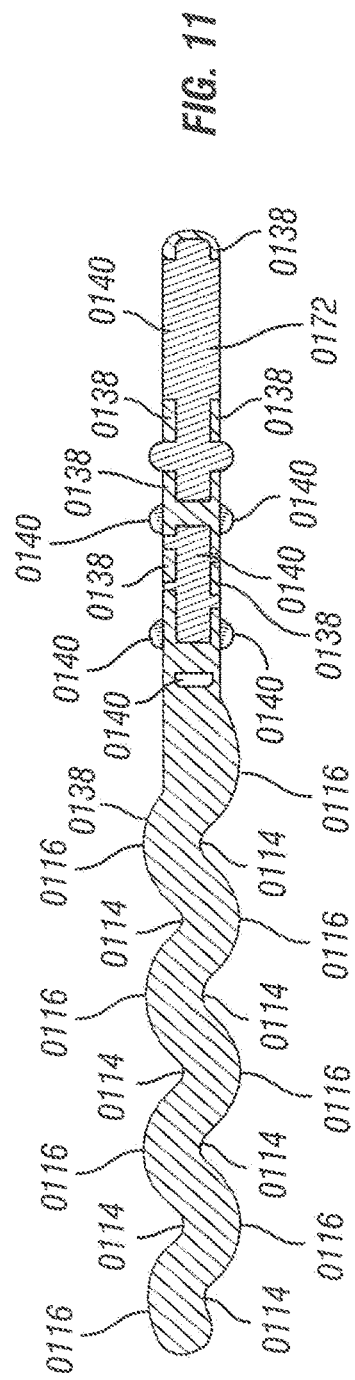
FIG. 11 is a cross-sectional view of the tool of FIG. 1 taken along Section A-A as depicted in FIG. 6.
Figure 12A:
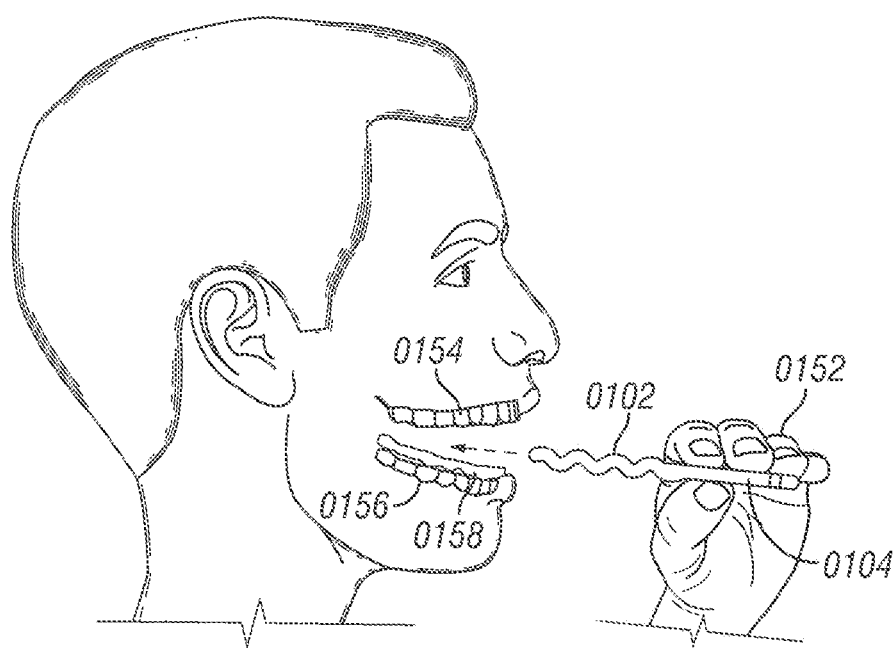
FIGS. 12A-12F illustrate the tool of FIG. 1 being used to seat an orthodontic aligner.
Figure 12B:
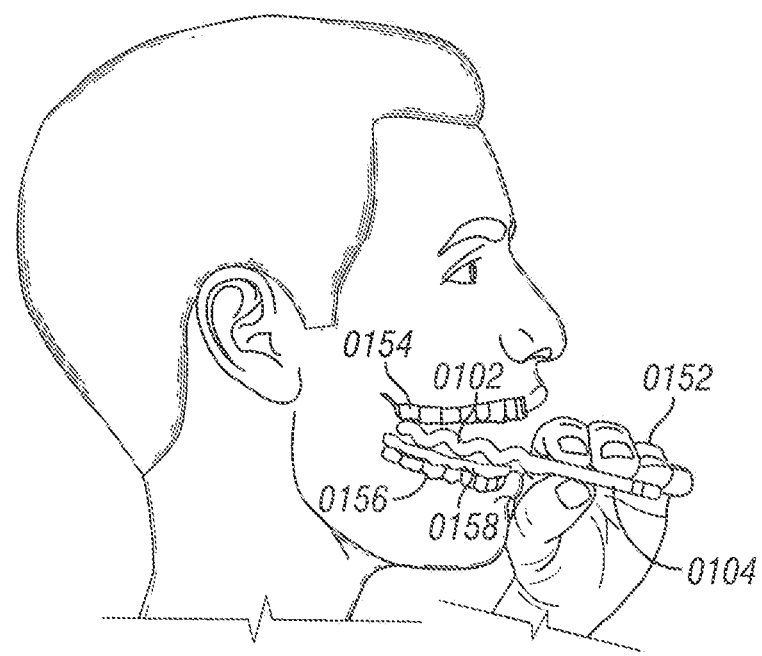
Figure 12C:
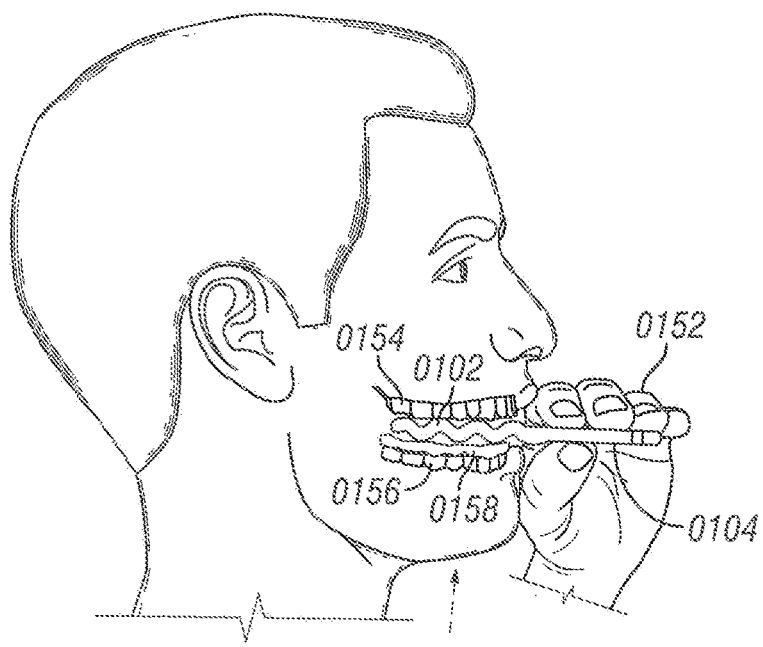
Figure 12D:
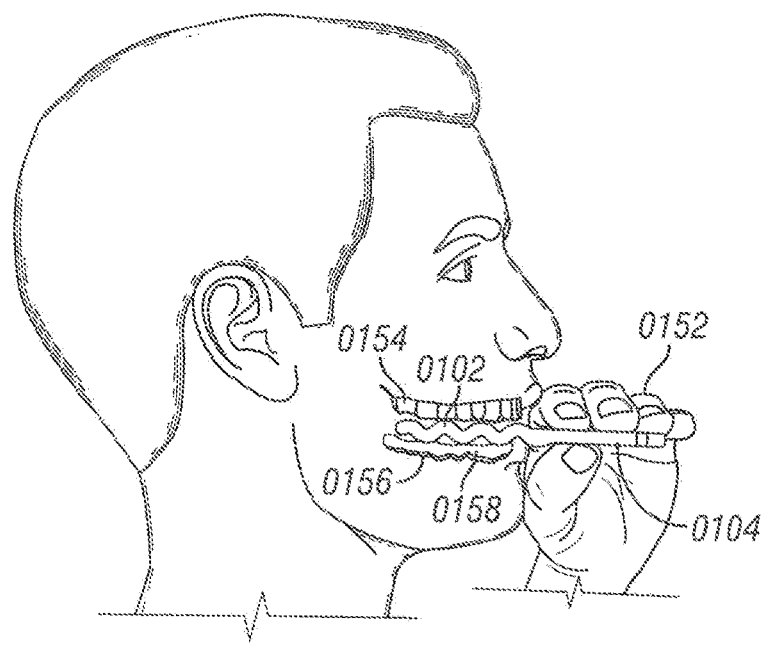
Figure 12E:
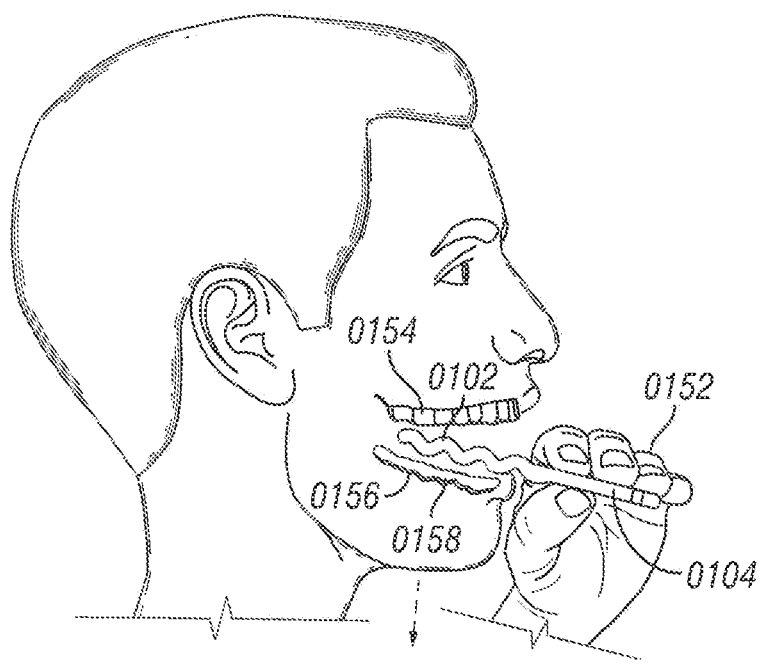
Figure 12F:
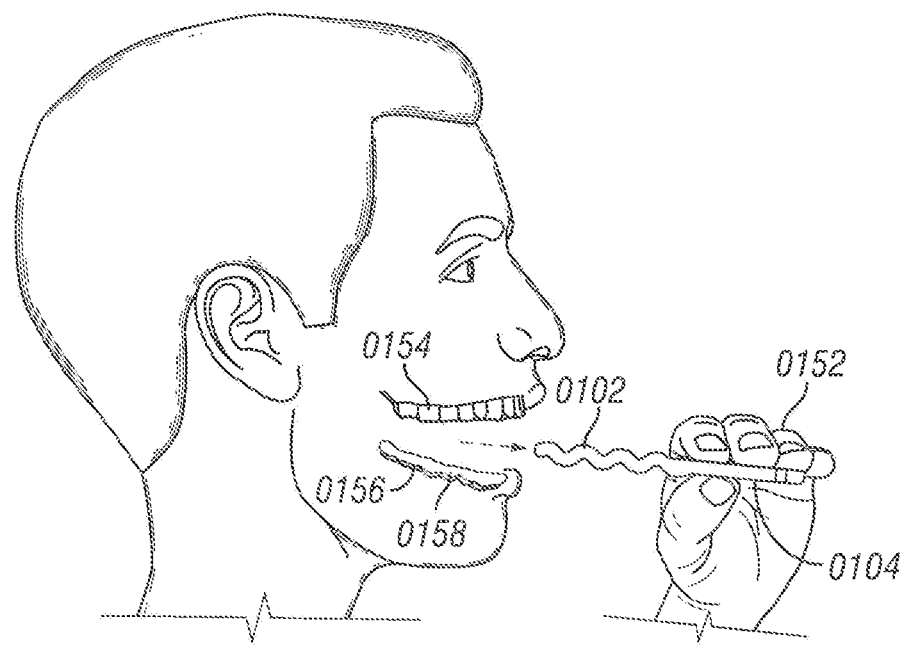
Figure 13A:
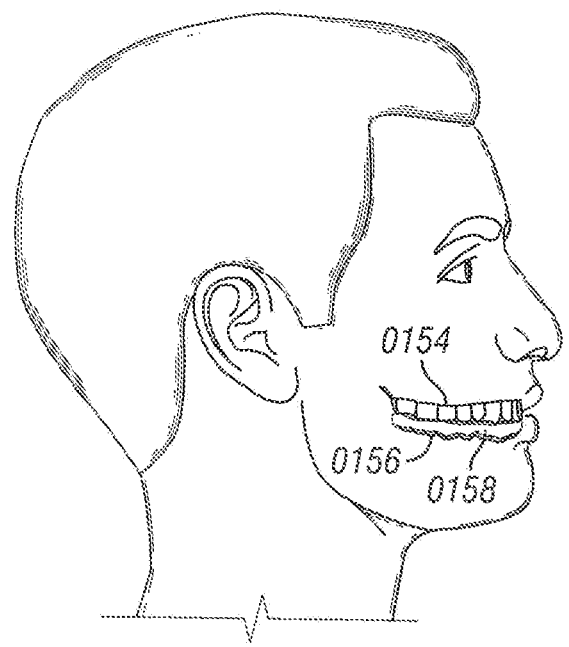
FIGS. 13A-13F illustrate the tool of FIG. 1 being used to unseat and facilitate removal of an orthodontic aligner.
Figure 13B:
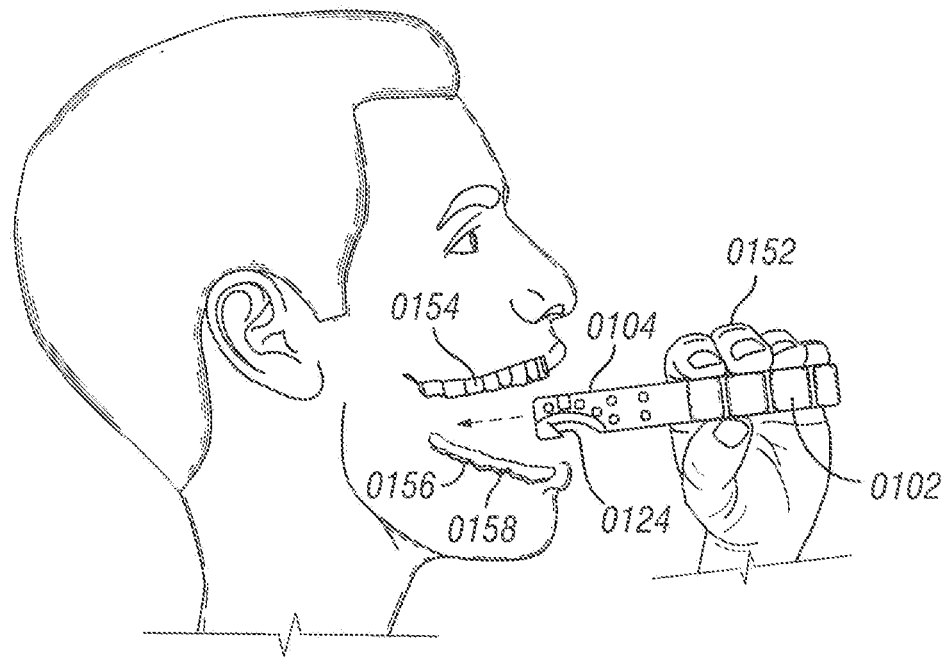
Figure 13C:
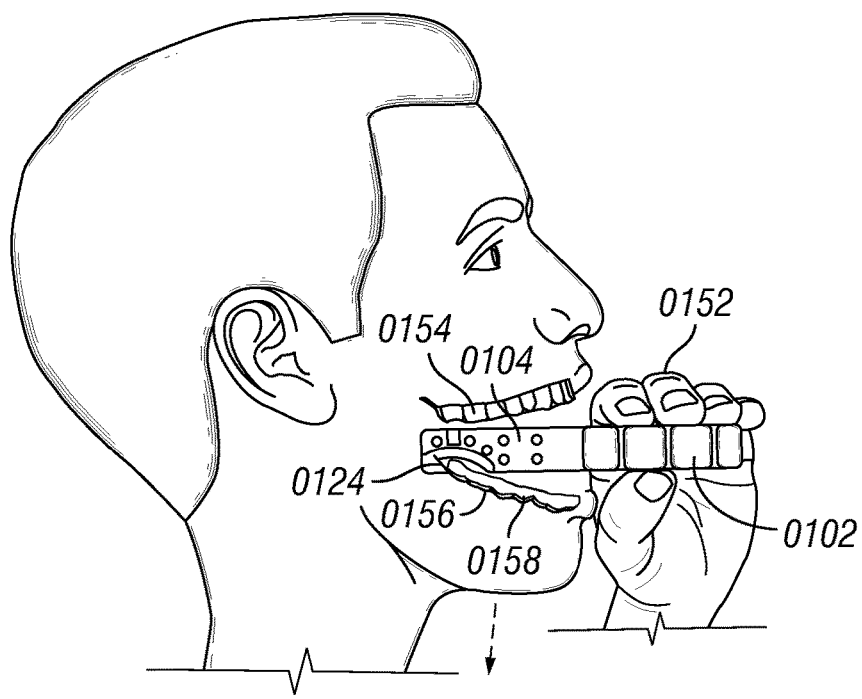
Figure 13D:
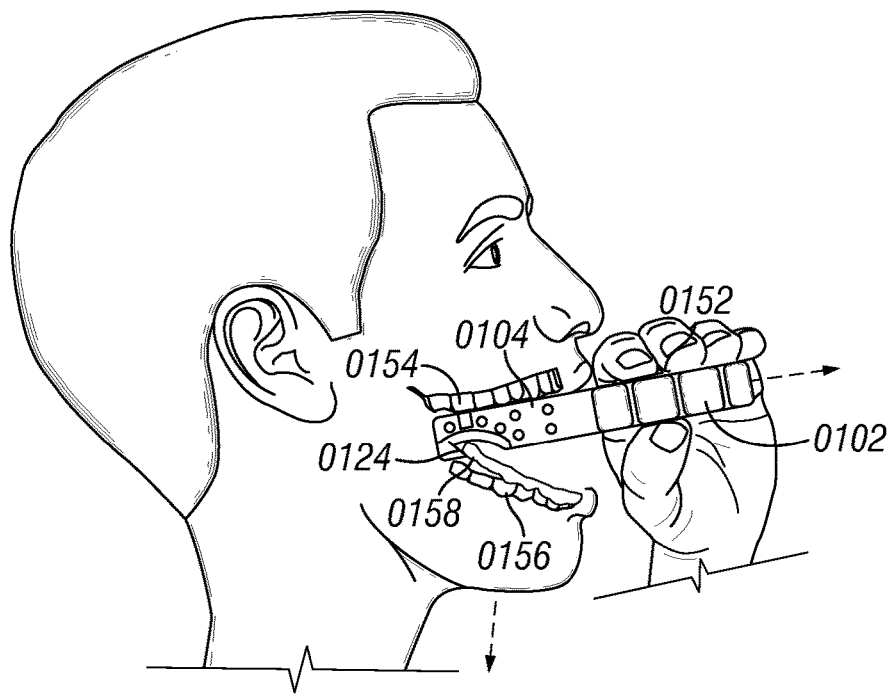
Figure 13E:
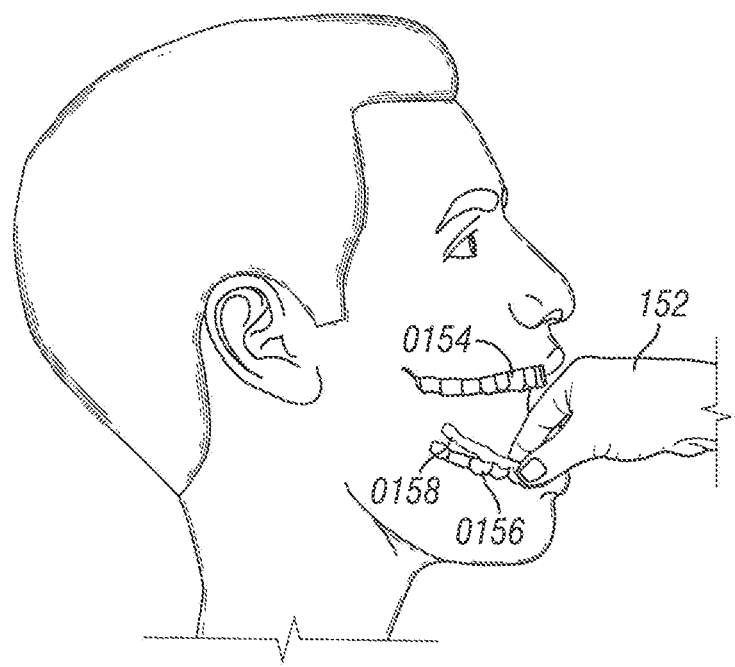
Figure 13F:
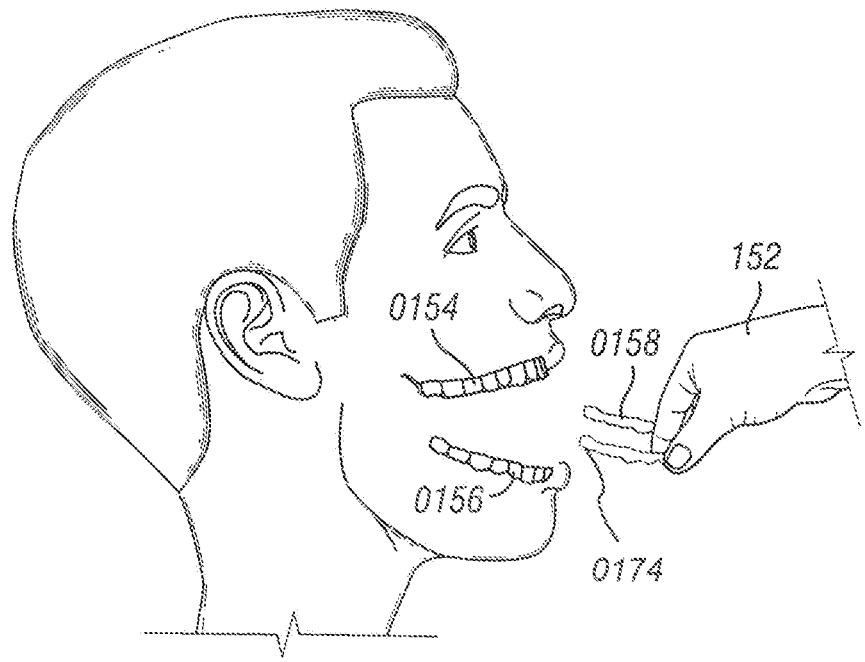

As illustrated in FIGS. 1 and 11, in some embodiments, the tool 0100 comprises a first material 0138 and a second material 0140. The first material 0138 is more elastic than the second material 0140, and the first material 0138 is configured to be chewed by the teeth of a human user to aid the human user in seating an orthodontic aligner 0158. The second material 0140 is configured to be me more rigid than the first material 0138. As an example, the second material 0140 can form a portion (e.g., at least 50, 60, 70, 80 or 90 wt. % and up to 100 wt. %) of the hook 0124, which portion of the hook 0124 is configured to contact, catch and unseat the orthodontic aligner 0158. This can make the hook 0124 more durable and also prevent the hook 0124 from deforming or compressing to an extent that the ability of the hook 0124 to catch and unseat the orthodontic aligner 0158 is significantly impaired. In some embodiments, the protrusions 0122 from the handle portion 0104 can comprise, consist essentially of, or consist of the second material 0140.

In some embodiment, the first material 0138 and the second material 0140 make up 80 to 100 wt. %, optionally 90 to 100 wt. %, of the tool 0100.

In some embodiments, the first material 0138 can be a first polymer, a first rubber, a first plastic, thermoplastic elastomer (TPE) (e.g., thermoplastic polyurethane (TPU)), or a combination thereof. The second material 0140 can be a second polymer, a second rubber, a second plastic, polypropylene (PP), or a combination thereof.

In some embodiments, the second material 0140 is configured to have a Shore D hardness equal to 70 to 83, optionally about 77, where the Shore D hardness is measured according to ISO 868:2003.

In some embodiments, a portion of the hook 0124 comprises the second material 0140. In some embodiments, a portion of the hook 0124 that consists the second material 0140 makes up 2 to 15 wt. % of the tool 0100. In some embodiments, the portion of the hook 0124 that consists of the second material 0140 makes up 10 to 40 wt. % of the handle portion 0104.

In some embodiments, the second material 0140 makes up 20 to 50 wt. % of the tool 0100. In some embodiments, the second material 0140 makes up 50 to 90 wt. % of the handle portion 0104.

Figure 8:
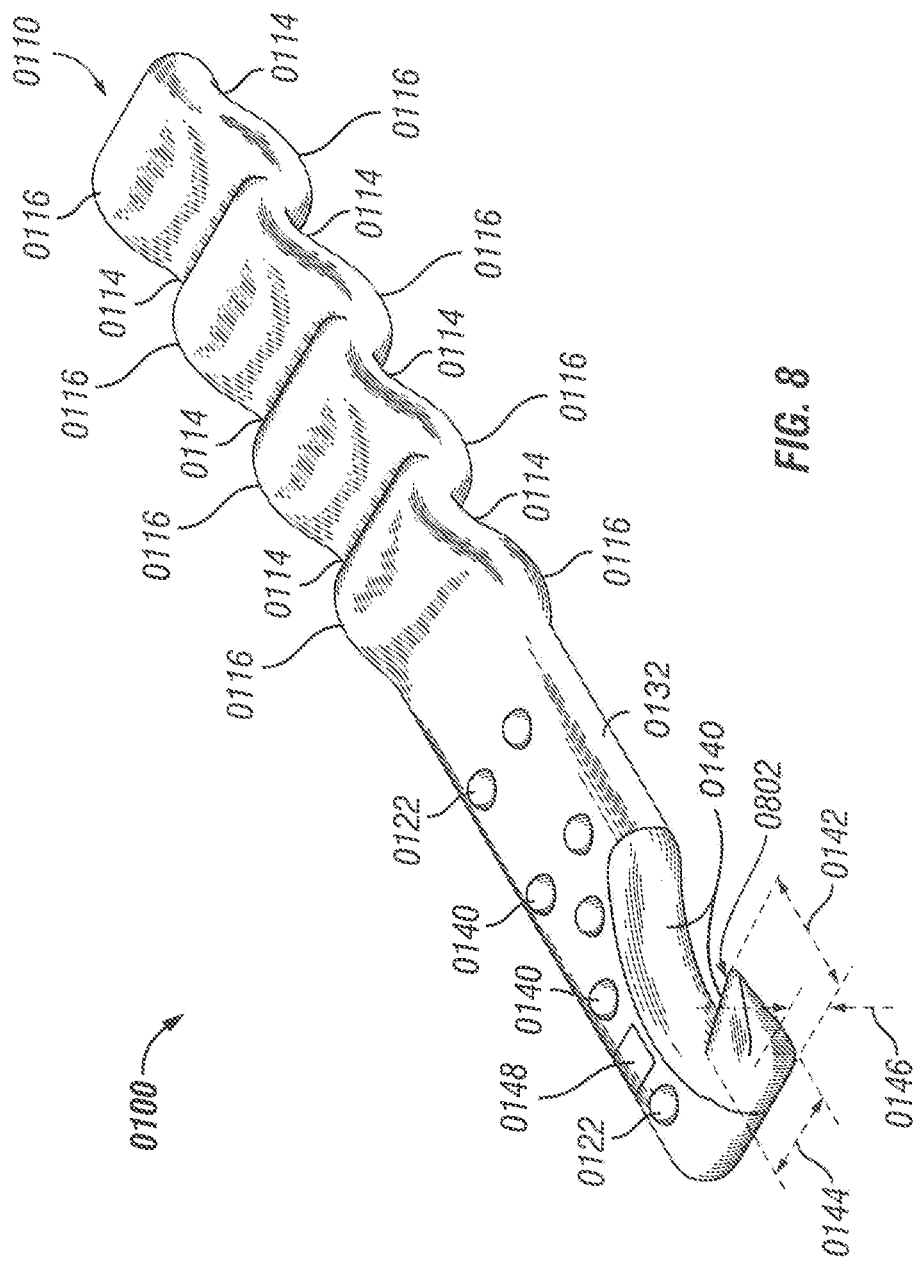
FIG. 8 is a perspective view taken from the rear, the top and the left side of the tool of FIG. 1.

With reference to FIG. 8, in some embodiments, a continuous portion of the hook 0124 (e.g., a catch portion 0802 of the hook that is configured to protrude from the tool 0100 to catch an aligner to facilitate removal of the aligner) is made up of 90 to 100 wt. % of the second material 0140 and (i) has a hook catch length 0142 equal to 3 to 15 mm or 3 to 10 mm or 3 to 6 mm as measured in the direction of the propagation of the series of waves in the rippled structure, (ii) has a hook catch thickness 0146 equal to 2 to 6.25 mm or 2 to 5 mm or 2 to 4 mm as measured from the top of the hook catch portion 0802 to the bottom of the hook catch portion 0802 in a direction perpendicular to the hook catch length 0142, (iii) has a hook catch width 0144 equal to 2 to 10 mm or 2 to 5 mm or 3 to 4 mm as measured in a direction perpendicular to the hook catch length 0142 and perpendicular to the hook catch thickness 0146, or (iv) any combination thereof.

In some embodiments, the second material 0140 forms a reinforcing portion 0148 of the handle portion 0104. The reinforcing portion 0148 is positioned in a narrower portion 0150 of the handle portion 0104 that is adjacent to the hook 0124. As can be seen, a narrower portion 0150 of the handle portion 0104 can be created when the hook 0124 is formed by a recess 0128 in the handle portion 0104. Accordingly, the narrower portion 0150 of the handle portion 0104 has a smaller width than other portions along the length of the handle portion 0104 and could be weaker than other portions without reinforcement. The reinforcing portion 0148 is configured to strengthen the narrower portion 0150 of the handle portion 0104 that is adjacent to the hook 0124. In some embodiments, the reinforcing portion 0148 has a mass equal to approximately 10% to 50% of the mass of the second material 0140 in the hook 0124.

With reference to the cross section of the tool shown in FIG. 11, in some embodiments, the handle portion 0104 comprises a reinforcing inner core 0172. The reinforcing inner core 0172 of the handle portion 0104 can comprise, consist essentially of, or consist of the second material 0140. The reinforcing inner core 0172 can make up 50 to 90 wt. % of the handle portion 0104.

In some embodiments, the first material 0138 makes up 50 to 80 wt. % of the tool 0100. The first material 0138 can make up 70 to 100 wt. % of the seating portion 0102. The first material 0138 can have a Shore A hardness equal to 40 to 90, optionally about 75, as measured according to ISO 868:2003. In some embodiments, the first material 0138 can have a Shore D hardness equal to 10 to 40, optionally about 25, as measured according to ISO 868:2003.

In some embodiments, thermoplastic elastomer (e.g., thermoplastic polyurethane), polypropylene, or a combination thereof make up 80 to 100 wt. % of the tool 0100.

With reference now to FIG. 12A to FIG. 12F, a method of seating an orthodontic aligner 0158 using a tool 0100 will be described. The method comprises several steps. A first step comprises holding a handle portion 0104 of the tool 0100 (e.g., in the hand 0152 of a user), which tool 0100 comprises the handle portion 0104 and a rippled seating portion 0102 opposite the handle portion 0104. Examples of the tool 0100 are provided in FIGS. 1-13F and their accompanying description.

A second step occurs subsequent to the first step and comprises positioning the seating portion 0102 of the tool 0100 between an upper set 0154 of teeth and a lower set 0156 of teeth.

A third step occurs subsequent to the second step and comprises biting the seating portion 0102 of the tool 0100 to seat the orthodontic aligner 0158 on the upper set 0154 of teeth or the lower set 0156 of teeth. The biting can occur repeatedly, resulting in a chewing step.

With reference to FIG. 13A to FIG. 13F, in some embodiments, a fourth step of the method can occur subsequent to the third step and comprises holding the seating portion 0102 of the tool 0100 (e.g., in the hand 0152 of the user), wherein the handle portion 0104 comprises a hook 0124. Examples of the tool 0100 are provided in FIGS. 1-11.

Also with reference to FIG. 13A to FIG. 13F, a fifth step of the method can occur subsequent to the fourth step and comprises using the hook 0124 to contact, catch, and apply force to a contacted portion of the aligner 0158, thereby unseating the aligner 0158 to facilitate removal of the aligner 0158. In some embodiments, the contacted portion of the aligner 0158 is an edge 0174 of the aligner 0158.

With reference again to FIG. 13A to FIG. 13F, a method of unseating an orthodontic aligner 0158 using a tool 0100, will now be described. The method comprises several steps. A first step comprises holding a rippled seating portion 0102 of the tool 0100 (e.g., in the hand 0152 of the user), which tool 0100 comprises the seating portion 0102 and a handle portion 0104 opposite the seating portion 0102. The handle portion 0104 comprises a hook 0124.

A second step occurs subsequent to the first step and comprises using the hook 0124 to contact, catch, and apply force to a contacted portion of the aligner 0158, thereby unseating the aligner 0158 to facilitate removal of the aligner 0158. In some embodiments, the contacted portion of the aligner 0158 is an edge 0174 of the aligner 0158.

ADDITIONAL EMBODIMENTS

The following clauses include descriptive embodiments that are offered as further support of the disclosed invention:

1. A tool for seating an orthodontic aligner, the tool comprising:
a handle portion (e.g., configured to be held by a hand of a human user); and
a seating portion connected to the handle portion and configured to seat an orthodontic aligner against teeth (e.g. the teeth of the human user);
optionally wherein the seating portion comprises a rippled structure; and
optionally wherein the rippled structure has the shape of a series of waves having a direction of propagation directed away from the handle portion, optionally wherein the waves are sinusoidal.

2. The tool of any preceding clause:
wherein the seating portion is positioned at the front of the tool;
wherein the handle portion is positioned at the rear of the tool;
wherein a peak of the front-most wave in the series of waves is positioned at the top of the tool;
wherein the bottom of the tool is positioned opposite the top of the tool;
wherein the right side of the tool is defined as the side of the tool that is to the right of the tool from the perspective of an upwardly oriented viewer who is looking at the tool while the front of the tool is facing the viewer, and the tool is positioned with the top side directed upwardly;
the left side of the tool is positioned opposite the right side of the tool; or
any combination thereof.

3. The tool of any preceding clause, wherein the waves comprise troughs and peaks;
optionally wherein the troughs of the waves extend in a trough transverse direction that is perpendicular to the direction of propagation within a tolerance of 30, 25, 20, 15, 10, 5, 4, 3, 2 or 1 degrees; and
optionally wherein the peaks of the waves extend in a peak transverse direction perpendicular to the direction of propagation within a tolerance of 30, 25, 20, 15, 10, 5, 4, 3, 2 or 1 degrees.

4. The tool of any preceding clause, wherein the handle portion comprises:
a body; and
protrusions that protrude from the body;
optionally wherein the protrusions are configured to reduce slipping between a hand (e.g., the hand of the human user) and the handle portion when the handle portion is in use;
optionally wherein the protrusions are spaced from each other;
optionally wherein the protrusions are rounded; and
optionally wherein the protrusion are hemispherical.

5. The tool of any preceding clause, wherein the handle portion comprises a hook, wherein the hook is configured to unseat an orthodontic aligner;
optionally wherein the hook is adjacent to a recess in the handle portion;
optionally wherein the hook is configured to unseat an orthodontic aligner while the seating portion is held by a hand (e.g., the hand of the human user);
optionally wherein the form of the hook creates a concave recess along a side (e.g., right side or left side) of the handle portion;

optionally wherein a front portion of the hook comprises a beveled edge configured to facilitate catching the orthodontic aligner;

optionally wherein the beveled edge is beveled at the top of the edge and the bottom of the edge, optionally wherein the hook comprises a corner (e.g., formed where the beveled edge meets a side of the handle portion);

optionally wherein the beveled edge faces at least partly toward the front of the tool;

optionally wherein the beveled edge faces within 55, 50, 45, 40, 35, 30, 25, 20, 15 or 10 degrees of the direction of propagation of the series of waves in the seating portion of the tool; and optionally wherein the bevelled edge forms an acute angle or right angle with the concave recess that forms the hook.

6. The tool of any preceding clause:

optionally wherein the tool is small enough to fit within a rectangular prism if the length of the rectangular prism is 43 mm (optionally 43, 45, 50, 55, 58, 60, 65, 70 or 73 mm), if the width of the rectangular prism is 6 mm (optionally 6, 6.5, 7, 7.5, 8, 8.5, 9, 9.5, or 10 mm), and if the thickness of the rectangular prism is 3.75 mm (optionally 3.75, 4, 4.25, 4.5, 4.75, 5, 5.25, 5.5, 5.75, 6, or 6.25 mm); and optionally wherein the tool is too large to fit within a rectangular prism if the length of the rectangular prism is less than 73 mm (optionally 73, 70, 65, 60, 58, 55, 50, 45 or 43 mm), if the width of the rectangular prism is less than 10 mm (optionally 10, 9.5, 9, 8.5, 8, 7.5, 7, 6.5, or 6 mm), or if the thickness of the rectangular prism is less than 6.25 mm (optionally 6.25, 6, 5.75, 5.5, 5.25, 5, 4.75, 4.5, 4.25, 4, or 3.75 mm).

7. The tool of any preceding clause, wherein the tool is made from materials that are safe to place in a human mouth.

8. The tool of any preceding clause, wherein the tool comprises a first material and a second material;

optionally wherein the first material is more elastic than the second material;

optionally wherein the first material is configured to be chewed by the teeth while the human user seats the orthodontic aligner;

optionally wherein the second material is configured to be me more rigid than the first material;

optionally wherein the second material forms a portion of the hook that is configured to contact and unseat the orthodontic aligner;

optionally wherein the second material forms a portion of the hook that is configured to contact, catch and unseat the orthodontic aligner;

optionally wherein the first material and the second material make up 80 to 100 wt. %, optionally 90 to 100 wt. %, of the tool;

optionally wherein protrusions on the handle portion comprise the second material;

optionally wherein the first material is a first polymer, a first rubber, a first plastic, thermoplastic elastomer (TPE) (e.g., thermoplastic polyurethane (TPE)), or a combination thereof and optionally wherein the second material is a second polymer, a second rubber, a second plastic, polypropylene (PP), or a combination thereof.

9. The tool of clause 8:

optionally wherein the second material has a Shore D hardness equal to at least 70, 71, 72, 73, 74, 75, 76, 77, 78, 79, 80, 81 or 82;

optionally wherein the second material has a Shore D hardness equal to no more than 83, 82, 81, 80, 79, 78, 77, 76, 75, 74, 73, 72 or 71; and optionally wherein the Shore D hardness is measured according to ISO 868:2003;

optionally wherein a portion of the hook comprises the second material;

optionally wherein a portion of the hook that consists the second material makes up 2 to 15 wt. % of the tool;

optionally wherein a portion of the hook that consists of the second material makes up 10 to 40 wt. % of the handle portion;

optionally wherein a portion of the hook that consists of the second material makes up 90 to 100 wt. % of the hook;

optionally wherein the second material makes up 20 to 50 wt. % of the tool;

optionally wherein the second material makes up 50 to 90 wt. % of the handle portion;

optionally wherein the second material makes up of 90 to 100 wt. % of a continuous portion of the hook (e.g., a catch portion of the hook that is configured to protrude from the tool to catch an aligner to facilitate removal of the aligner);

optionally wherein a continuous portion of the hook (e.g., a catch portion of the hook that is configured to protrude from the tool to catch an aligner to facilitate removal of the aligner) has a hook catch length equal to 3 to 15 mm, 3 to 10 mm or 3 to 6 mm as measured in the direction of the propagation of the series of waves in the rippled structure;

optionally wherein the second material makes up of 90 to 100 wt. % of a continuous portion of the hook (e.g., a catch portion of the hook that is configured to protrude from the tool 0100 to catch an aligner to facilitate removal of the aligner);

optionally wherein a continuous portion of the hook (e.g., a catch portion of the hook that is configured to protrude from the tool to catch an aligner to facilitate removal of the aligner) has a hook catch thickness equal to 2 to 6.25 mm, 2 to 5 mm, or 2 to 4 mm as measured from the top of the portion of the hook to the bottom of the portion of the hook in a direction perpendicular to the hook catch length; and optionally wherein the second material makes up of 90 to 100 wt. % of a continuous portion of the hook (e.g., a catch portion of the hook that is configured to protrude from the tool 0100 to catch an aligner to facilitate removal of the aligner);

optionally wherein a continuous portion of the hook (e.g., a catch portion of the hook that is configured to protrude from the tool to catch an aligner to facilitate removal of the aligner) has a hook catch width equal to 2 to 10 mm, 2 to 5 mm, or 3 to 5 mm as measured in a direction perpendicular to the hook catch length and perpendicular to the hook catch thickness.

9. The tool of clause 8, wherein the second material forms a reinforcing portion of the handle portion;

optionally wherein the reinforcing portion is positioned in a narrower portion of the handle portion that is adjacent to the hook and thereby narrower than other portions of the handle portion;

optionally wherein the reinforcing portion is configured to strengthen the narrower portion of the handle portion adjacent to the hook; and optionally wherein the reinforcing portion has a mass equal to approximately 10% to 50% of the mass of the second material in the hook.

10. The tool of clause 8, wherein a reinforcing core (e.g., reinforcing inner core) of the handle portion comprises the second material;

optionally wherein the reinforcing core (e.g., reinforcing inner core) makes up 50 to 90 wt. % of the handle portion.

11. The tool of clause 8, optionally wherein the first material makes up 50 to 80 wt. % of the tool;

optionally wherein the first material makes up 70 to 100 wt. % of the seating portion;

optionally wherein the first material has a Shore A hardness equal to at least 40, 45, 50, 55, 60, 65, 70, 75, 80 or 85;

optionally wherein the first material has a Shore A hardness equal to no more 90, 85, 80, 75, 70, 65, 60, 55, 50, or 45;

optionally wherein the Shore A hardness is measured according to ISO 868:2003;

optionally wherein the first material has a Shore D hardness equal to at least 10, 15, 20, 25, 30 or 35;

optionally wherein the first material has a Shore D hardness equal to no more than 40, 35, 30, 25, 20, or 15; and optionally wherein the Shore D hardness is measured according to ISO 868:2003.

12. The tool of any preceding clause, wherein thermoplastic elastomer (e.g., thermoplastic polyurethane), polypropylene, or a combination thereof makes up 80 to 100 wt. % of the tool.

13. A method of using (e.g., holding or placing) a tool (e.g., for seating an orthodontic aligner), wherein the tool comprises a handle portion and a rippled seating portion opposite the handle portion, the method comprising:

optionally holding the handle portion of the tool (e.g., in a human hand, whether gloved or not);

optionally positioning the seating portion of the tool between an upper set of teeth and a lower set of teeth (e.g., of a human); and optionally biting the seating portion of the tool to seat the orthodontic aligner on the upper set of teeth or the lower set of teeth;

optionally wherein the tool is the tool of any preceding clause.

14. The method of any preceding clause, wherein the tool (e.g., the handle portion of the tool) comprises a hook, the method comprising:

optionally holding the seating portion of the tool; and optionally using the hook to contact a contacted portion of the aligner, thereby unseating the aligner to facilitate removal of the aligner;

optionally using the hook to catch a contacted portion of the aligner, thereby unseating the aligner to facilitate removal of the aligner; and optionally using the hook to apply force to a contacted portion of the aligner, thereby unseating the aligner to facilitate removal of the aligner.

15. The method of clause 14, wherein the contacted portion of the aligner is an edge of the aligner.

16. A method of using (e.g., holding or placing) a tool (e.g., for unseating an orthodontic aligner), wherein the tool comprises a handle portion and optionally a seating portion (e.g., rippled seating portion) opposite the handle portion, and wherein the handle portion comprises a hook, the method comprising:

optionally holding the seating portion of the tool;

optionally using the hook to contact a contacted portion of the aligner, thereby unseating the aligner to facilitate removal of the aligner;

optionally using the hook to catch a contacted portion of the aligner, thereby unseating the aligner to facilitate removal of the aligner; and optionally using the hook to apply force to a contacted portion of the aligner, thereby unseating the aligner to facilitate removal of the aligner.

17. The method of clause 16, wherein the contacted portion of the aligner is an edge of the aligner.

Although the invention has been described above and in the drawings using a handle portion 0104 that is generally the shape of a rectangular prism with rounded edges, the tool 0100 is not limited to this shape. For example, the edges need not be rounded, although rounded edges can be more comfortable to a user. Additionally, the handle need not be generally shaped like a rectangular prism, although the rectangular prism shape can facilitate a user's ability to control the movement of the seating portion 0102 and can help provide a thin tool 0100 that fits more easily in a case for an orthodontic aligner 0158.

Although the invention is described above and in the drawings using a seating portion 0102 that is generally a smoothly rippled shape comprising a series of identical or nearly identical sinusoidal waves with rounded edges, the tool 0100 is not limited to this shape. For example, the edges need not be rounded, although rounded edges can be more comfortable to a user. Additionally, the waves can vary in their shape and orientation, although it can be advantageous for the adjusted amplitude of the waves to vary by no more than 30, 20, 15, 10, 5, 4, 3, 2 or 1% from the shortest adjusted amplitude wave to the largest adjusted amplitude wave, where the amplitude is measured as the distance between adjacent opposite facing peaks 0116 where one peak 0116 is on the top 0162 of the tool 0100 and one peak 0116 is on the bottom 0164 of the tool 0100. Avoiding variations in the adjusted amplitude of the wave peaks 0116 can facilitate a user's ability to seat an aligner 0158 and can help provide a thin tool 0100 that fits more easily in a case for an orthodontic aligner 0158. Additionally, the rippled shape need not be sinusoidal waves. Rather, the rippled shape can comprise a series of triangular or rectangular shaped waves; however, the sinusoidal shaped waves can be more comfortable for a user, and could provide better seating performance when compared to other shapes. Additionally, some embodiments of the tool 0100 comprise a shape that is solid, rather than rippled, for the seating portion 0102. However, the seating portion 0102 can be advantageous. For example, having differently sized areas to bite on can facilitate seating an aligner 0158 at different portions of the teeth, such as the incisors or cuspids at the front 0108 of the mouth, or the premolars or molars towards the back of the mouth.

In some embodiments, the shapes of the handle portion 0104, the hook 0124, the seating portion 0102, the rippled shape of the seating portion 0102, or any combination thereof can vary as long as the shape still performs the respective function of each component as described herein.

Although embodiments of the invention have been described using the word "comprising," additional embodiments can be created by replacing the word "comprising" with "consisting essentially of" or "consisting of."

Although embodiments of the invention have been described using a first range with a first set of end points, additional embodiments can be created by replacing the first range with a narrower range whose endpoints are selected from any value contained in the first range.

Although embodiment of the invention have been described using a specific direction relative to a reference direction, additional embodiments can be created by indicating that specific direction can vary from the reference direction by no more than 45, 40, 35, 30, 25, 20, 15, 10, 5, 4, 3, 2 or 1 degrees.

Although the invention hereof has been described by way of preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A tool configured for seating an orthodontic aligner, the tool comprising:
   a handle portion configured to be held by a hand of a human user; and
   a seating portion connected to the handle portion and configured to seat an orthodontic aligner against the teeth of the human user;
   wherein the seating portion comprises a rippled structure;
   wherein the rippled structure comprises a series of waves, the series of waves comprising a plurality of alternating troughs and peaks, and wherein the series of waves forms both a top surface and a bottom surface of the seating portion;
   wherein a length of the tool is from 43.5 to 72.5 mm;
   wherein a width of the tool is from 6 to 10 mm as measured in a direction perpendicular to the length;
   wherein a thickness of the tool is from 3.75 mm to 6.25 mm as measured in a direction perpendicular to the length and the width, wherein any protrusions of the tool are excluded from the thickness of the tool, and wherein a portion of the rippled structure adjacent to the handle portion is excluded from the thickness of the tool; and
   wherein the handle portion comprises a hook, wherein the hook is configured to unseat an orthodontic aligner while the seating portion is held by the hand of the human user.

2. The tool of claim 1,
   wherein the troughs of the series of waves extend in a trough transverse direction that is within 30 degrees of perpendicular to a direction of propagation of the series of waves; and
   wherein the peaks of the series of waves extend in a peak transverse direction that is within 30 degrees of perpendicular to the direction of propagation of the series of waves.

3. The tool of claim 1, wherein the handle portion comprises:
   a body; and
   protrusions that protrude from the body;
   wherein the protrusions are configured to reduce slipping between the hand and the handle portion when the handle portion is in use.

4. The tool of claim 1, wherein the tool comprises a first material; and
   a second material, wherein the first material is more elastic than the second material;
   wherein the first material is configured to be chewed by the teeth while the human user seats the orthodontic aligner;
   wherein the second material is configured to be me more rigid than the first material; and
   wherein the second material forms a portion of hook that is configured to contact and unseat the orthodontic aligner.

5. The tool of claim 4,
   wherein the second material has a Shore D hardness equal to 70 to 83.

6. The tool of claim 4, wherein the second material forms a reinforcing portion of the handle portion;
   wherein the reinforcing portion is positioned in a narrower portion of the handle portion that is adjacent to the hook and thereby narrower than other portions of the handle portion; and
   wherein the reinforcing portion is configured to strengthen the narrower portion of the handle portion adjacent to the hook.

7. The tool of claim 4, wherein a reinforcing inner core of the handle portion comprises the second material.

8. The tool of claim 4, wherein the first material has a Shore A hardness equal to 40 to 90 or a Shore D hardness equal to 10 to 40.

9. The tool of claim 1, wherein thermoplastic elastomer, polypropylene, or a combination thereof makes up 80 to 100 wt. % of the tool.

10. The tool of claim 1, wherein the series of waves comprises sinusoidal waves.

11. The tool of claim 1, wherein the series of waves comprises at least two continuous waves.

12. A method of seating an orthodontic aligner using a tool, the method comprising:
    holding a handle portion of the tool, wherein the tool comprises the handle portion and a rippled seating portion opposite the handle portion, wherein the seating portion comprises a series of waves, the series of waves comprising a plurality of alternating troughs and peaks, and wherein the series of waves forms both a top surface and a bottom surface of the seating portion;
    positioning the seating portion of the tool between an upper set of teeth and a lower set of teeth; and
    biting the seating portion of the tool to seat the orthodontic aligner on the upper set of teeth or the lower set of teeth.

13. The method of claim 12, wherein the series of waves comprises at least two continuous waves.

14. A method of seating and unseating an orthodontic aligner using a tool, the method comprising:
    holding a handle portion of the tool, wherein the tool comprises the handle portion and a rippled seating portion opposite the handle portion, wherein the seating portion comprises a series of waves, the series of waves comprising a plurality of alternating troughs and peaks, and wherein the series of waves forms both a top surface and a bottom surface of the seating portion;
    positioning the seating portion of the to between an upper seat of teeth and a lower set of teeth;
    biting the seating portion of the tool to seat the orthodontic aligner on the upper set of teeth or the lower seat of teeth;
    holding the seating portion of the tool, wherein the handle portion comprises a hook; and
    using the hook to contact and apply force to a contacted portion of the aligner, thereby unseating the aligner to facilitate removal of the aligner.

15. The method of claim 14, wherein the contacted portion of the aligner is an edge of the aligner.

16. A tool for seating an orthodontic aligner, the tool comprising:

a handle portion configured to be held by a hand of a human user; and a seating portion connected to the handle portion and configured to seat an orthodontic aligner against the teeth of the human user;

wherein the seating portion comprises a rippled structure;

wherein the rippled structure comprises a series of waves, the series of waves comprising a plurality of alternating troughs and peaks, and wherein the series of waves forms both a top surface and a bottom surface of the seating portion;

wherein a length of the tool is from 43.5 to 72.5 mm;

wherein a width of the tool is from 6 to 10 mm as measured in a direction perpendicular to the length;

wherein a thickness of the tool is from 3.75 mm to 6.25 mm as measured in a direction perpendicular to the length and the width, wherein any protrusions of the tool are excluded from the thickness of the tool, and wherein a portion of the rippled structure adjacent to the handle portion is excluded from the thickness of the tool; and wherein the tool comprises a first material and a second material, wherein the first material is more elastic than the second material;

wherein the first material is configured to be chewed by the teeth while the human user seats the orthodontic aligner;

wherein the second material is configured to be me more rigid than the first material; and wherein the second material forms a portion of a hook that is configured to contact and unseat the orthodontic aligner.

* * * * *

UNITED STATES PATENT AND TRADEMARK OFFICE
CERTIFICATE OF CORRECTION

PATENT NO. : 11,291,527 B2
APPLICATION NO. : 16/532884
DATED : April 5, 2022
INVENTOR(S) : Shannon Marie Scherr and Michael Woodford Freitas Page 1 of 1

It is certified that error appears in the above-identified patent and that said Letters Patent is hereby corrected as shown below:

In the Claims

In Column 13, Line 66, replace "to be me more" with --to be more--.

In Column 14, Line 1, replace "forms a portion of hook" with --forms a portion of a hook--.

In Column 14, Lines 54-55, replace "of the to between an upper seat of teeth" with --of the tool between an upper set of teeth--.

In Column 14, Line 57, replace "or the lower seat of" with --or the lower set of--.

Signed and Sealed this
Twenty-fourth Day of October, 2023

Katherine Kelly Vidal
*Director of the United States Patent and Trademark Office*